United States Patent [19]

Schoettle et al.

[11] Patent Number: 4,915,322
[45] Date of Patent: Apr. 10, 1990

[54] CASSETTE AND LOCKING ELEMENT FOR THE SAME

[75] Inventors: Klaus Schoettle, Heidelberg; Lothar Gliniorz, Frankenthal, both of Fed. Rep. of Germany

[73] Assignee: Basf Aktiengesellschaft, Ludwigshafen, Fed. Rep. of Germany

[21] Appl. No.: 257,013

[22] Filed: Oct. 13, 1988

[30] Foreign Application Priority Data

Oct. 15, 1987 [DE] Fed. Rep. of Germany ....... 8713865

[51] Int. Cl.$^4$ ............................................. G11B 23/087
[52] U.S. Cl. .................................... 242/198; 360/132
[58] Field of Search ............................... 242/197–199; 360/132

[56] References Cited

U.S. PATENT DOCUMENTS

| | | | |
|---|---|---|---|
| 4,466,538 | 8/1984 | Giannis et al. | 242/198 |
| 4,712,150 | 12/1987 | Pertzsch et al. | 360/132 |
| 4,744,530 | 5/1988 | Cybulski et al. | 242/198 |
| 4,786,012 | 11/1988 | Ino et al. | 242/198 |

Primary Examiner—Joseph J. Hail, III
Attorney, Agent, or Firm—Keil & Weinkauf

[57] ABSTRACT

A cassette incorporating a locking element, in particular for a hinged flap of the cassette, has mounting elements which are arranged so as not to turn in at least one retaining slit and a resiliently flexible integrated part which products a bending and torsional stress when the locking element is actuated.

10 Claims, 2 Drawing Sheets

CASSETTE AND LOCKING ELEMENT FOR THE SAME

Cassette for a magnetic tape having a cassette housing, a closure flap covering an opening in the cassette housing, a retaining wall in the cassette housing and an at least partially flexible locking element, which is mounted on the cassette housing and serves to release and lock the closure flap, as well as the locking element itself.

A cassette incorporating a locking element is known, in which a pivotally mounted locking plate bears against the housing of the cassette by means of a separate hinged spring fixed to it, in order to produce a prestressing in the locking position. In the locking position, a directly locking projection on the locking plate is in engagement with a recess in a hinged flap of the cassette. To unlock the locking mechanism, another projection on the locking plate is actuated from outside the housing to release the locking plate. The therefore; locking plate is thereby swung against the prestress and releases the hinged flap to open the cassette (compare FIG. 1 for this prior art).

U.S. Pat. No. 4,466,583 discloses another cassette incorporating a locking flap for the same purpose, the hinged spring of the above prior art being substituted by an integrated, molded-on plastics hinged spring. Even this configuration of an integrated plastics spring in disadvantageous due to the complicated and involved production process in which complex molds are necessary and due to the projecting plastics springs which hinder further processing and assembly of the cassettes by becoming hooked.

It is an object of the present invention to overcome the disadvantages of the known cassettes incorporating locking elements and to make their production more economical.

We have found that this object is achieved with a cassette for a magnetic tape having a cassette housing, a closure flap covering an opening in the cassette housing, a retaining wall in the cassette housing and an at least partially flexible locking element which is mounted on the cassette housing and serves to release and lock the closure flap, comprising a locking element which has a mounting means which is mounted in at least one retaining wall in the cassette housing, the shapes of at least one mounting element of the mounting means and of the retaining slit corresponding to each other in such a way as to prevent said at least one mounting element turning in the retaining slit.

Consequently, depending on type and frictional conditions of the mounting means, actuation of the locking means produces spring forces by means of the resiliently flexible part.

In a further development, the mounting means and the retaining slit in the retaining wall are designed such that the mounting means is arranged so as not to turn in the retaining slit. In practice, the resilient flexible part may be designed at its ends or the mounting elements themselves may be designed with rectangular cross-sections, and the retaining slits may have at least partially a correspondingly elongate shape with approximately parallel side edges. This has the effect that the spring forces are determined solely by the design and arrangement of the resiliently flexible part and becomes independent of the type and design of the mounting means.

In practice, the locking element may have a T shape, the locking means being formed at the base of the T shape and the resiliently flexible part with the mounting elements at the ends being formed at the top of the T shape and the middle part taking the form of a substantially rigid connecting part.

This makes it possible for the element to be produced with great material savings and nevertheless function satisfactorily.

Furthermore, if the retaining slits are of semicircular shape, the mounting elements may take the form of circular or semicircular disks which are attached decentrally on the ends of the resiliently flexible part.

Furthermore, however, it is also possible that the mounting element or elements take the form of end parts of angled pieces, the planes of the end parts being arranged at an angle to the plane of the resiliently flexible part.

The resiliently flexible part may also be formed on one side, unsymmetrically to the T shape, provided that the other mounting means is arranged so as to turn.

A very advantageous locking element for a cassette may comprise a mounting means and a locking means connected to it, the mounting means being in engagement with at least one retaining wall in the cassette housing, the locking means being provided at a distance from the axis of the mounting means and the locking element having at least one spring element to produce a spring stress for actuation of the locking means against the said spring stress, achieved by the locking element having in the region of the mounting means a resiliently flexible part on which a rigid connecting part to the locking means is provided, so that, when the locking means is actuated, the resiliently flexible part is resiliently deformed and the pivoting movement of the locking element about an axis at least close to the resiliently flexible part takes place.

The invention is described below with reference to examples represented in the drawings, in which:

FIG. 3 shows a second T-shaped locking element with integrated spring and a retaining slit in the retaining wall of a cassette according to the invention FIG. 4 shows a T-shaped locking element with a mounting which is unable to turn on one side, in a cassette according to the invention.

Figure 1:
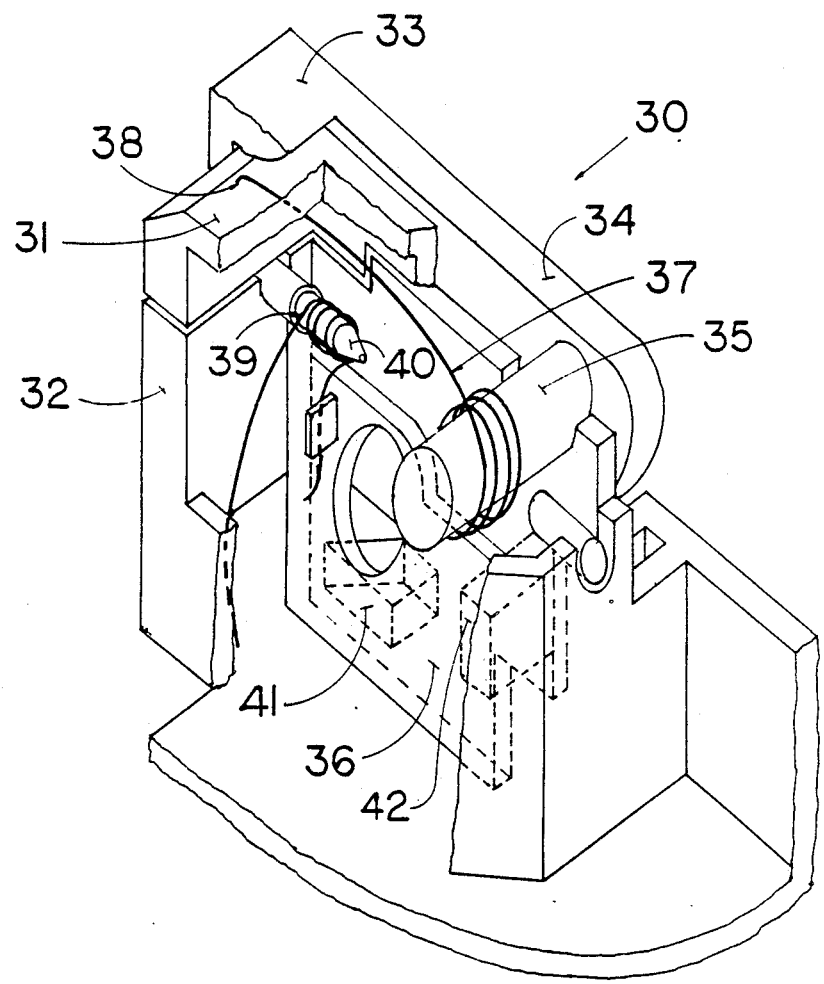
FIG. 1 shows a front corner part of a commercially available videotape cassette having a front hinged flap and a locking plate, according to the prior art, shown partly in section.

FIG. 1 shows a front corner part 30 of a VHS cassette comprising upper and lower housing parts 31, 32, which are suitably connected to each other. A hinged flap 33 having side walls 34, onto the insides of which pins 35 about which the hinged flap can pivot are molded on, serves to protect the tape (not shown) against damage. In the lower housing part 31, there is a pivotal locking plate 36 which brings about the locking of the locking plate 36 by means of a projection 41 which engages in a recess (not shown) in the flap side wall 34. In the closed position, the hinged flap 33, with side walls 34, is prestressed with respect to the housing parts 31, 32 by a leg spring 37 provided on a stub 35, the legs 38 of which spring engage the underside of the hinged flap 33. The locking plate 36 is prestressed in its locking position by a further leg spring 39, which is arranged on the mounting pin 40 of the locking plate 36 and the legs of which bear against a rib of the housing bottom part 32. On the locking plate 36 there is also a larger actuating projection 42, which can be actuated from outside the cassette.

Figure 2:
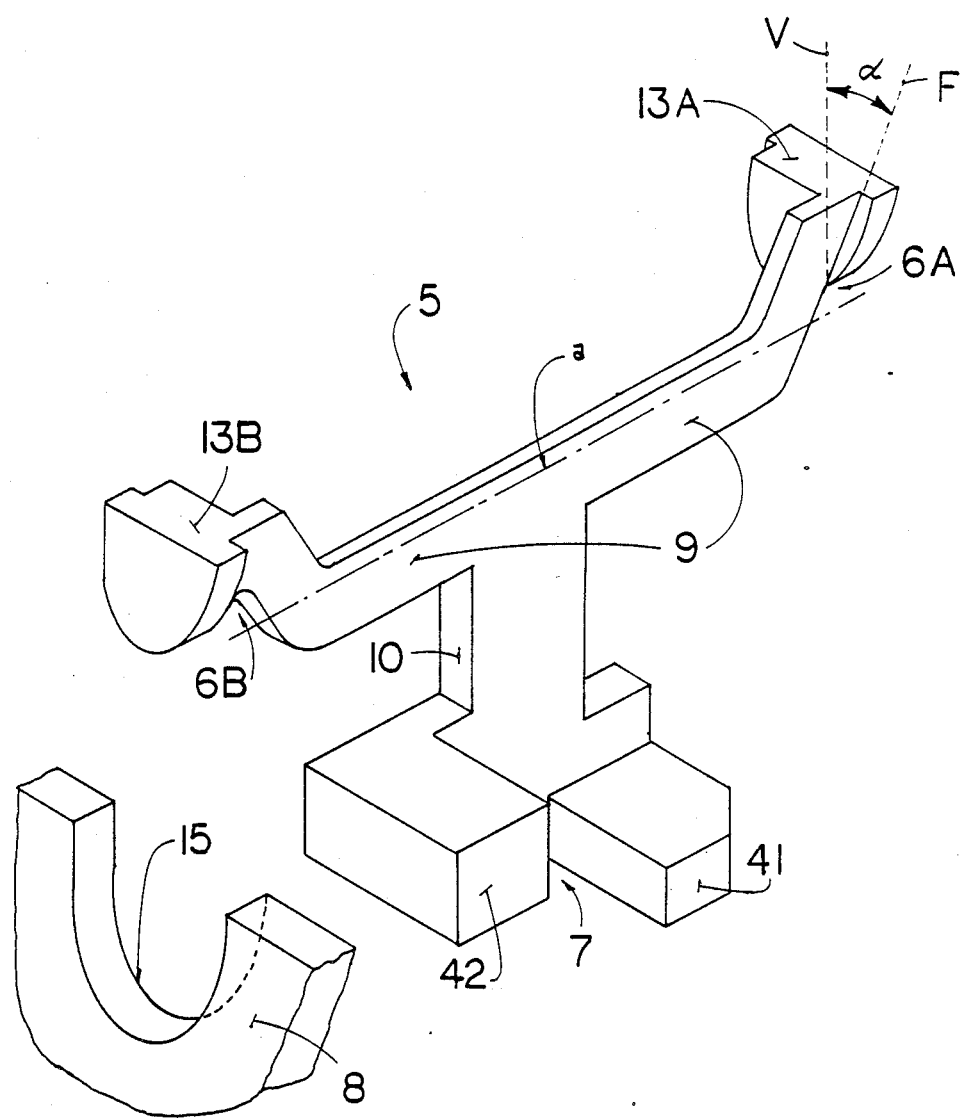
FIG. 2 shows a first T-shaped locking element with integrated spring for a cassette according to the invention.

FIG. 2 shows a locking element for a cassette according to the present invention which has substantially a T shape but is designed as slightly forked upward, incorporating at the base the locking means 7, formed by projections 41 and 42 (corresponding to the projections 41 and 42 in FIG. 1) for locking and for actuation, respectively, incorporating a relatively rigid middle part 10 and incorporating at the top the resiliently deformable, flexible part 9, at the ends of which the mounting elements 6A and 6B are fitted. The resiliently flexible part 9 is provided here as a slightly forked, flat, cross-sectionally rectangular plastics parts. Depending on the characteristics of the plastics material, the part 9 may also take the form of a small plate (in the case of relatively spring-hard material) or else take on another cross-section, as long as the prerequisite functions of the invention, in particular the spring function, of the locking element 5 are fulfilled. The middle part 10 and the projections 41 and 42 are rigid in comparison with part 9.

The mount elements 6A and 6B here take the form of semicircular disks 13A and 13B which are attached to the narrow sides of the ends of the flat resiliently flexible part 9, ie. a reproduced by injection molding. The semicircular disks 13A, 13B fit into the semicircular slit 15 in the retaining part 8, a fragment of which is shown. Consequently, the twisting rigidity of the mounting elements 6A and 6B is already ensured by form closure. Fully circular disks or other appropriate shapes of retaining slits and mounting elements such as polygonal shapes etc. are also conceivable.

In FIG. 3, the retaining slit 11 has a narrow rectangular shape and is accordingly adapted to the shape of the mounting elements 6A and 6B and has roughly the same cross-sectional shape as the remaining part 9', which here has an unforked T shape. The mounting elements 6A and 6B are formed with an angled piece 14 and rectangular end parts 13A and B, as a result of which the desired twisting rigidity is again obtained merely by form closure.

In all designs, an angle between the vertical V and the joining edges or lines E and F between the end parts 13A and 13B and the resiliently flexible part 9 is designated as angle α. These angles α are chosen in the range from about 5 to 10° to compensate for production tolerances, for example when polyacetal is used, ie. the position of the mounting elements is to twist within this angular range relative to the resiliently flexible part 9, but with untwistable mounting of the bearing elements. The position of the angle α is chosen such that the twisting measure produces a directed prestress in the range from 1 to 5 cN in the direction of the locking position of the locking element.

Unlike the previous designs, the locking element 16 in FIG. 4 is formed with a mounting corresponding to FIG. 2 which is unable to turn on one side. In this embodiment, the resiliently flexible part 9'' is on one side and unsymmetrically on the top of the T, while the middle part with the other side part is designed as a rigid part 18. The shortened swivel axis is designated a''.

Upon actuation of the projection 42, the locking element 5 (16) functions as follows: the relatively rigid middle part 10 exerts an actuating force on the resiliently flexible part 9, 9', which is secured so as not to twist by mounting elements 6A, 6B, as a result of which bending and torsion spring stresses occur in the part 9, 9', which counteract the actuating force. The bending and torsion spring stresses can be adjusted on the part 9, 9', by shaping, type of restraint, material selection and lever design. The pivoting of the locking element 5 takes place approximately about the swivel axis a, a'. Actuating the projection 42 also disengages the projection 41 of the locking means 7 from the hinged flap 33, which can be opened as a result. In the case of the design of FIG. 4, the resiliently flexible part 9'' of the locking element 16 is retained so as not to turn only on one side, so that production of spring force is unsymmetrical to the T shape (part 9). The deforming pivoting movement in this case takes place about the "shortened" axis a''.

All plastics which can be processed by injection molding, in particular all thermoplastics (eg. polyacetal, polypropylene, ABS etc.) may be used as materials.

The locking element according to the invention has the advantage that no additional springs or spring arms are required; thus making production of the cassettes more economical. That is the "spring" (parts 9, 9', 9'') is arranged in the surface of the locking element so that the latter can be produced simply and effectively, and can be installed favorably without additional space requirement.

The use of a bending and torsion spring arrangement of this type is also advantageously possible in the case of other cassette components, for example in the braking or retaining of the reels or for actuating slides (opening cover slides).

We claim:

1. A locking element for a cassette, which comprises a mounting means and a locking means connected to the mounting means, the locking means being provided at a distance from an axis of the mounting means and the locking means having at least one spring element that produces a spring stress for actuation of the locking means, and wherein the locking means has in the region of the mounting means a resiliently flexible part, on which a rigid connecting part to the locking means is provided, so that, when the locking means is actuated on the cassette, the resiliently flexible part is resiliently deformed and pivoting movement of the locking element about the axis at least close to the resiliently flexible part takes place wherein the locking element has a substantially T shape, the locking means is located at the base of the T shape, the resiliently flexible part constitutes at least one of the arms of the T shaped locking element, said at least one arm having a mounting element at the end thereof, nonrotatably mounted with respect to the cassette and a middle part is substantially rigid.

2. The locking element of claim 1, wherein the mounting means has mounting elements as end parts, wherein the lines joining the end parts and the resilient flexible part are arranged at an angle of from about 80 to 85°.

3. The locking element of claim 2, wherein, the resiliently flexible part has a prestress in the range from 1 to 5 cN.

4. A cassette for a magnetic tape, which comprises:
   (a) a cassette housing;
   (b) a closure flap covering an opening in the cassette housing;
   (c) a retaining wall in the cassette housing; and (d) a generally T-shaped locking means located in the cassette housing for releasing and locking the closure flap, wherein the locking means has;
  (i) a means for mounting the locking means, the mounting means having a shape corresponding to a shape in a noncircular retaining slit in the cassette housing and being placed on an arm of the T-shaped locking means preventing rotation of the mounting means,
  (ii) a resiliently flexible part located on an arm of the T-shaped locking means, and
  (iii) locking and actuating projections located at a base of the generally T-shaped locking means.

5. The cassette of claim 4, wherein the mounting means has circular or semicircular disks that are attached decentrally at the ends of the resiliently flexible part.

6. The cassette of claim 4, wherein the mounting means has angled end parts, and wherein the end parts and the resiliently flexible part are arranged at an angle of $90° - \alpha$, where $\alpha$ is substantially between 5° and 10° and is an angle which lies between a vertical line and a joining edge of the end parts.

7. The cassette of claim 6, wherein the locking means has a prestress in the range from 1 to 5 cN.

8. The cassette of claim 4, wherein the resiliently flexible part is placed on one arm of the generally T-shaped locking means and the other arm is substantially rigid.

9. The cassette of claim 4, wherein the mounting means has a rectangular cross-section and the retaining slits in the retaining wall of the cassette housing have approximately parallel side edges.

10. A cassette for a magnetic tape which comprises a cassette housing, a closure flap covering an opening in the cassette housing, a retaining wall in the cassette housing and a locking device, wherein the improvement comprises:
  (a) a generally T-shaped means for releasing and locking the closure flap, the generally T-shaped means having first and second mounting elements located respectively on opposing first and second arms of the generally T-shaped means, the first and second mounting elements engaging the cassette housing an retaining wall respectively;
  (b) at least one resiliently flexible arm;
  (c) a substantially rigid middle part;
  (d) a locking means located at the base of the middle part and;
  (e) a means for nonrotatably mounting the mounting element of said at least one flexible arm with respect to the cassette housing.

* * * * *

UNITED STATES PATENT AND TRADEMARK OFFICE
CERTIFICATE OF CORRECTION

PATENT NO. : 4,915,322

DATED : April 10, 1990

INVENTOR(S) : Klaus Schoettle, et al.

It is certified that error appears in the above-identified patent and that said Letters Patent is hereby corrected as shown below:

```
The title page should be deleted to appear as per attached title page.
Figures  3 and 4 should be printed as per attached pages.
```

Signed and Sealed this

Twenty-third Day of March, 1993

*Attest:*

STEPHEN G. KUNIN

*Attesting Officer*   Acting Commissioner of Patents and Trademarks

United States Patent [19]

Schoettle et al.

[11] Patent Number: 4,915,322

[45] Date of Patent: Apr. 10, 1990

[54] CASSETTE AND LOCKING ELEMENT FOR THE SAME

[75] Inventors: Klaus Schoettle, Heidelberg; Lothar Gliniorz, Frankenthal, both of Fed. Rep. of Germany

[73] Assignee: Basf Aktiengesellschaft, Ludwigshafen, Fed. Rep. of Germany

[21] Appl. No.: 257,013

[22] Filed: Oct. 13, 1988

[30] Foreign Application Priority Data

Oct. 15, 1987 [DE] Fed. Rep. of Germany ....... 8713865

[51] Int. Cl.⁴ .................................... G11B 23/087
[52] U.S. Cl. .................................... 242/198; 360/132
[58] Field of Search .................... 242/197–199; 360/132

[56] References Cited

U.S. PATENT DOCUMENTS

| | | | |
|---|---|---|---|
| 4,466,538 | 8/1984 | Giannis et al. | 242/198 |
| 4,712,150 | 12/1987 | Pertzsch et al. | 360/132 |
| 4,744,530 | 5/1988 | Cybulski et al. | 242/198 |
| 4,786,012 | 11/1988 | Ino et al. | 242/198 |

Primary Examiner—Joseph J. Hail, III
Attorney, Agent, or Firm—Keil & Weinkauf

[57] ABSTRACT

A cassette incorporating a locking element, in particular for a hinged flap of the cassette, has mounting elements which are arranged so as not to turn in at least one retaining slit and a resiliently flexible integrated part which products a bending and torsional stress when the locking element is actuated.

10 Claims, 2 Drawing Sheets

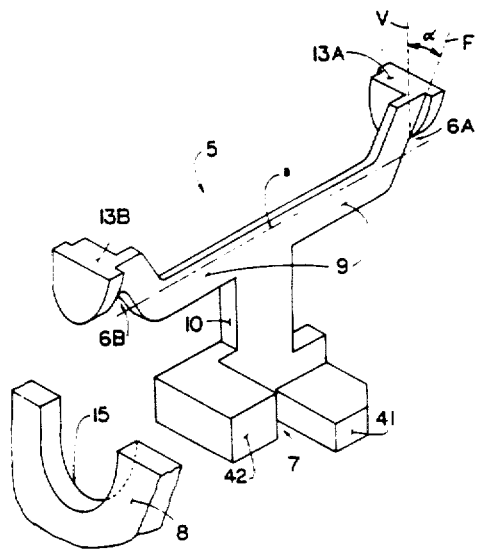

UNITED STATES PATENT AND TRADEMARK OFFICE
CERTIFICATE OF CORRECTION

PATENT NO.  : 4,915,322

DATED       : April 10, 1990

INVENTOR(S) : SCHOETTLE, Klaus; GLINIORZ, Lothar

It is certified that error appears in the above-identified patent and that said Letters Patent is hereby corrected as shown below:

It is requested that Figure 4 be published as part of the patent.

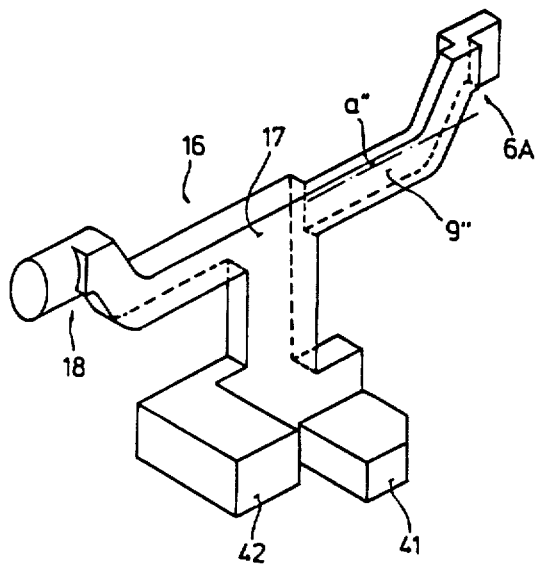

FIG.4

UNITED STATES PATENT AND TRADEMARK OFFICE
CERTIFICATE OF CORRECTION

PATENT NO. : 4,915,322

DATED : April 10, 1990

INVENTOR(S) : SCHOETTLE, Klaus; GLINIORZ, Lothar

It is certified that error appears in the above-identified patent and that said Letters Patent is hereby corrected as shown below:

It is requested that Figure 3 be published as part of the patent.

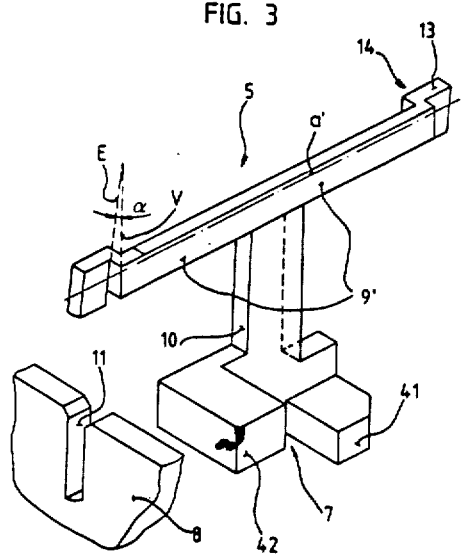

FIG. 3